US011929574B2

(12) United States Patent
Chen et al.

(10) Patent No.: US 11,929,574 B2
(45) Date of Patent: Mar. 12, 2024

(54) ELECTRICAL CONNECTOR WITH HDMI 2.1 SPECIFICATION AND A SIMPLE STRUCTURE THAT CAN MEET THE CONDITIONS REQUIRED FOR HIGH-FREQUENCY SIGNAL TRANSMISSION

(71) Applicant: Advanced Connectek Inc., New Taipei (TW)

(72) Inventors: Chingtien Chen, New Taipei (TW); Wei Wan, New Taipei (TW); Xiaojuan Qi, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 218 days.

(21) Appl. No.: 17/544,943

(22) Filed: Dec. 8, 2021

(65) Prior Publication Data

US 2022/0181816 A1 Jun. 9, 2022

(30) Foreign Application Priority Data

Dec. 8, 2020 (CN) ......................... 202011423280.9

(51) Int. Cl.
*H01R 13/60* (2006.01)
*H01R 12/72* (2011.01)
(Continued)

(52) U.S. Cl.
CPC ........... *H01R 13/50* (2013.01); *H01R 12/724* (2013.01); *H01R 13/04* (2013.01); *H01R 13/6581* (2013.01); *H01R 2107/00* (2013.01)

(58) Field of Classification Search
CPC .... H01R 13/50; H01R 13/04; H01R 13/6581; H01R 12/724; H01R 2107/00
(Continued)

(56) References Cited

U.S. PATENT DOCUMENTS 8,066,532 B2 * 11/2011 Hou .................. H01R 13/6658 439/660
10,700,455 B1 * 6/2020 Shen .................. H01R 13/502
(Continued)

FOREIGN PATENT DOCUMENTS

CN 201699199 U * 1/2011
CN 202997114 U * 6/2013
(Continued)

*Primary Examiner* — Peter G Leigh
(74) *Attorney, Agent, or Firm* — JCIPRNET

(57) ABSTRACT

An electrical connector with HDMI 2.1 specification, including an insulating body, multiple terminals, and a metallic shell partially enclosing the insulating body and the terminals, is provided. The terminals include ten terminals located in an upper row and nine terminals located in a lower row. The ten terminals are sequentially a first terminal Data2+, a third terminal Data2−, a fifth terminal Data Shield, a seventh terminal Data0+, a ninth terminal Data0−, a eleventh terminal Data3 Shield, a thirteenth terminal CEC, a fifteenth terminal SCL, a seventeenth terminal DDC/CEC Ground, and a nineteenth terminal Hot Plug Detec1 along an arrangement direction. The nine terminals are sequentially a second terminal Data2 Shield, a fourth terminal Data1+, a sixth terminal Data1−, an eighth terminal Data0 Shield, a tenth terminal Data3+, a twelfth terminal Data3−, a fourteenth terminal Utility, a sixteenth terminal SDA, and an eighteenth terminal +5V Power along the arrangement direction.

26 Claims, 7 Drawing Sheets

(51) Int. Cl.

| | |
|---|---|
| ***H01R 13/04*** | (2006.01) |
| ***H01R 13/50*** | (2006.01) |
| ***H01R 13/6581*** | (2011.01) |
| *H01R 107/00* | (2006.01) |

(58) Field of Classification Search
USPC .......................................................... 439/604
See application file for complete search history.

(56) References Cited

U.S. PATENT DOCUMENTS

| | | | | |
|---|---|---|---|---|
| 2010/0184329 | A1* | 7/2010 | Hou | H01R 13/6471 439/660 |
| 2014/0020246 | A1* | 1/2014 | Sommers | H01R 12/725 29/843 |
| 2016/0181712 | A1* | 6/2016 | Wig | H01R 12/737 29/842 |
| 2020/0076133 | A1* | 3/2020 | Shen | H01R 13/6473 |
| 2020/0295832 | A1* | 9/2020 | Bai | H04B 10/27 |
| 2020/0322054 | A1* | 10/2020 | Bai | H04N 21/43635 |
| 2020/0359084 | A1* | 11/2020 | Lin | H04B 10/25751 |
| 2020/0365112 | A1* | 11/2020 | Oh | H04N 21/43635 |
| 2020/0381417 | A1* | 12/2020 | Salcedo | H01L 29/7436 |

FOREIGN PATENT DOCUMENTS

| | | | | | |
|---|---|---|---|---|---|
| CN | 104577390 | A | * | 4/2015 | |
| CN | 207753202 | U | * | 8/2018 | H01R 13/02 |
| CN | 109950724 | A | * | 6/2019 | |
| CN | 111224269 | A | * | 6/2020 | H01R 13/24 |
| CN | 111244657 | A | * | 6/2020 | |
| CN | 211508081 | U | * | 9/2020 | |
| CN | 110011091 | B | * | 11/2020 | H01R 13/02 |

* cited by examiner

ELECTRICAL CONNECTOR WITH HDMI 2.1 SPECIFICATION AND A SIMPLE STRUCTURE THAT CAN MEET THE CONDITIONS REQUIRED FOR HIGH-FREQUENCY SIGNAL TRANSMISSION

CROSS-REFERENCE TO RELATED APPLICATION

This application claims the priority benefit of China application serial no. 202011423280.9, filed on Dec. 8, 2020. The entirety of the above-mentioned patent application is hereby incorporated by reference herein and made a part of this specification.

BACKGROUND

Technical Field

The disclosure relates to an electrical connector.

Description of Related Art

With the rapid development of electronic technology nowadays, the resolution of display devices is increasing and the requirements for high transmission bandwidth have led to the emergence of the high-definition multimedia interface (HDMI). The HDMI is a fully digitalized image and audio transmission interface that can simultaneously send uncompressed audio and video signals and is widely applied in the audio-visual transmission of consumer electronic products to ensure that the signals are not attenuated during the audio-visual transmission process.

Furthermore, as high-quality images gradually become the mainstream motion picture standard, the data transmission bandwidth in the past may not meet the functional requirements of the video transmission interface in the future, so the new HDMI 2.1 specification has been formulated. The transmission bandwidth is upgraded all the way to 48 Gbps from 18 Gbps of HDMI 2.0 and supports various higher dynamic image pixels and update rates. In addition, high-dynamic range (HDR) and low-latency transmission technologies have also been added to the functions and can be compatible with the previous HDMI 2.0 specification.

As a result, the terminal structure required for the new HDMI 2.1 specification is more complicated, which increases the difficulty of the required mold design, and even requires at least two sets of different molds to meet the requirements of the new specification, resulting in an increase in manufacturing costs.

SUMMARY

The disclosure provides an electrical connector with HDMI 2.1 specification and a simple structure that can meet the conditions required for high-frequency signal transmission.

An electrical connector with HDMI 2.1 specification of the disclosure includes an insulating body, multiple terminals, and a metallic shell. The metallic shell partially covers the insulating body and the terminals. The terminals include ten terminals located in an upper row and nine terminals located in a lower row, and are interleaved with each other along an arrangement direction of the terminals. The ten terminals located in the upper row are sequentially a first terminal Data2+, a third terminal Data2−, a fifth terminal Data Shield, a seventh terminal Data0+, a ninth terminal Data0−, an eleventh terminal Data3 Shield, a thirteenth terminal CEC, a fifteenth terminal SCL, a seventeenth terminal DDC/CEC Ground, and a nineteenth terminal Hot Plug Detecl along the arrangement direction. The nine terminals located in the lower row are sequentially a second terminal Data2 Shield, a fourth terminal Data1+, a sixth terminal Data1−, an eighth terminal Data0 Shield, a tenth terminal Data3+, a twelfth terminal Data3−, a fourteenth terminal Utility, a sixteenth terminal SDA, and an eighteenth terminal +5V Power along the arrangement direction.

An electrical connector with HDMI 2.1 specification of the disclosure includes an insulating body, multiple terminals, and a metallic shell. The metallic shell partially covers the insulating body and the terminals. The terminals include ten terminals located in an upper row and nine terminals located in a lower row, and are interleaved with each other along an arrangement direction of the terminals. The ten terminals located in the upper row are sequentially a first terminal Data2+, a third terminal Data2−, a fifth terminal Data Shield, a seventh terminal Data0+, a ninth terminal Data0−, an eleventh terminal Data3 Shield, a thirteenth terminal CEC, a fifteenth terminal SCL, a seventeenth terminal DDC/CEC Ground, and a nineteenth terminal Hot Plug Detecl along the arrangement direction. The nine terminals located in the lower row are sequentially a second terminal Data2 Shield, a fourth terminal Data1+, a sixth terminal Data1−, an eighth terminal Data0 Shield, a tenth terminal Data3+, a twelfth terminal Data3−, a fourteenth terminal Utility, a sixteenth terminal SDA, and an eighteenth terminal +5V Power along the arrangement direction. The first terminal has a width of 0.50 mm to 0.53 mm, the third terminal has a width of 0.30 mm to 0.33 mm, the fourth terminal has a width of 0.30 mm to 0.33 mm, the sixth terminal has a width of 0.30 mm to 0.33 mm, the seventh terminal has a width of 0.30 mm to 0.33 mm, the ninth terminal has a width of 0.30 mm to 0.33 mm, the tenth terminal has a width of 0.30 mm to 0.33 mm, and the twelfth terminal has a width of 0.30 mm to 0.33 mm.

Based on the above, the electrical connector with HDMI 2.1 specification includes the insulating body, the terminals, and the metallic shell. The metallic shell partially covers the insulating body and the terminals. The terminals include the ten terminals located in the upper row and the nine terminals located in the lower row, and have specific pin assignments along the arrangement direction. Furthermore, there are differences in the widths of the terminals along the arrangement direction. The first terminal, the third terminal, the fourth terminal, the sixth terminal, the seventh terminal, the ninth terminal, the tenth terminal, and the twelfth terminal have larger widths, that is, the terminals with larger widths are used to transmit data, so the requirements for high-frequency signal transmission can be met through increasing the widths of the terminals.

DETAILED DESCRIPTION OF DISCLOSED EMBODIMENTS

Figure 1:
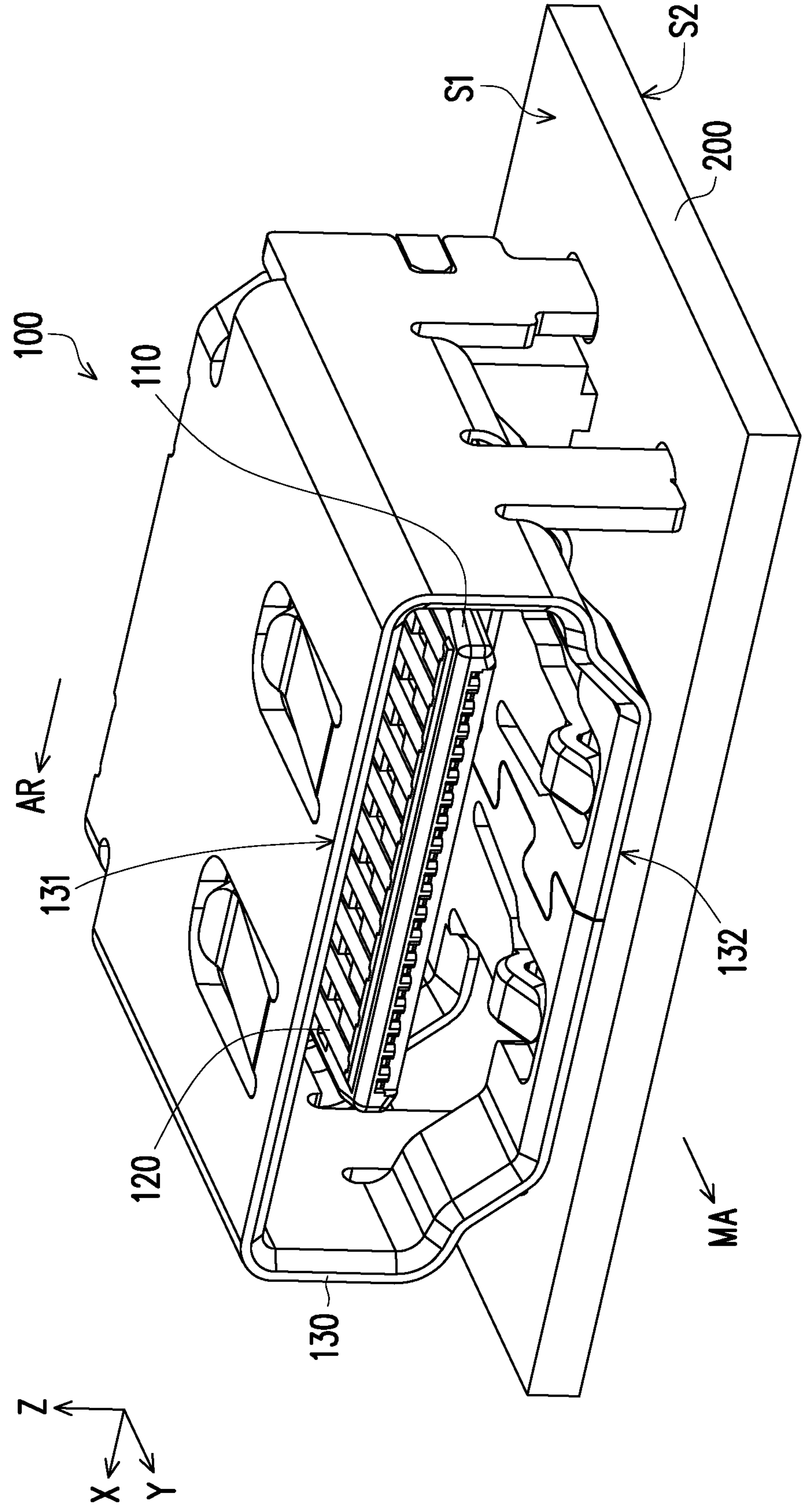
FIG. 1 is a schematic diagram of an electrical connector according to an embodiment of the disclosure.
Figure 2:
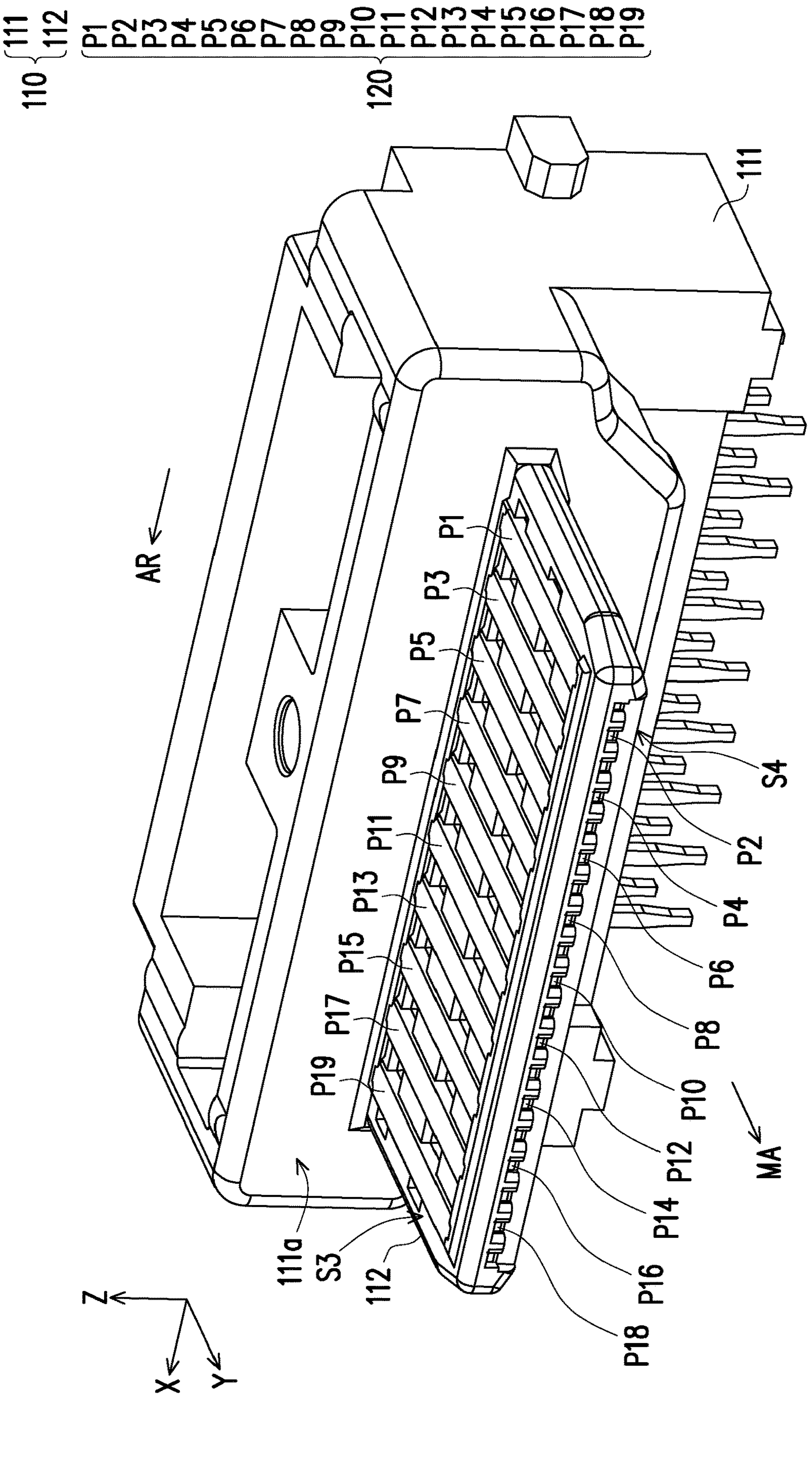
FIG. 2 is a schematic diagram of partial components of the electrical connector of FIG. 1.

FIG. 1 is a schematic diagram of an electrical connector according to an embodiment of the disclosure. FIG. 2 is a schematic diagram of partial components of the electrical connector of FIG. 1. The embodiment further provides Cartesian coordinates X-Y-Z to facilitate the subsequent description of components. Please refer to FIG. 1 and FIG. 2 at the same time. In the embodiment, an electrical connector 100 with HDMI 2.1 specification includes an insulating body 110, multiple terminals 120, and a metallic shell 130. The metallic shell 130 partially encloses the insulating body 110 and the terminals 120 to form an insertion space. Here, the electrical connector 100 is, for example, an electrical receptacle connector configured on a circuit board 200, wherein the circuit board 200 has two surfaces S1 and S2 opposite to each other, and the electrical connector 100 is particularly an on-board electrical connector configured on the surface S1. In another embodiment not shown, the electrical connector 100 may also be a sinker electrical connector.

Figure 3:
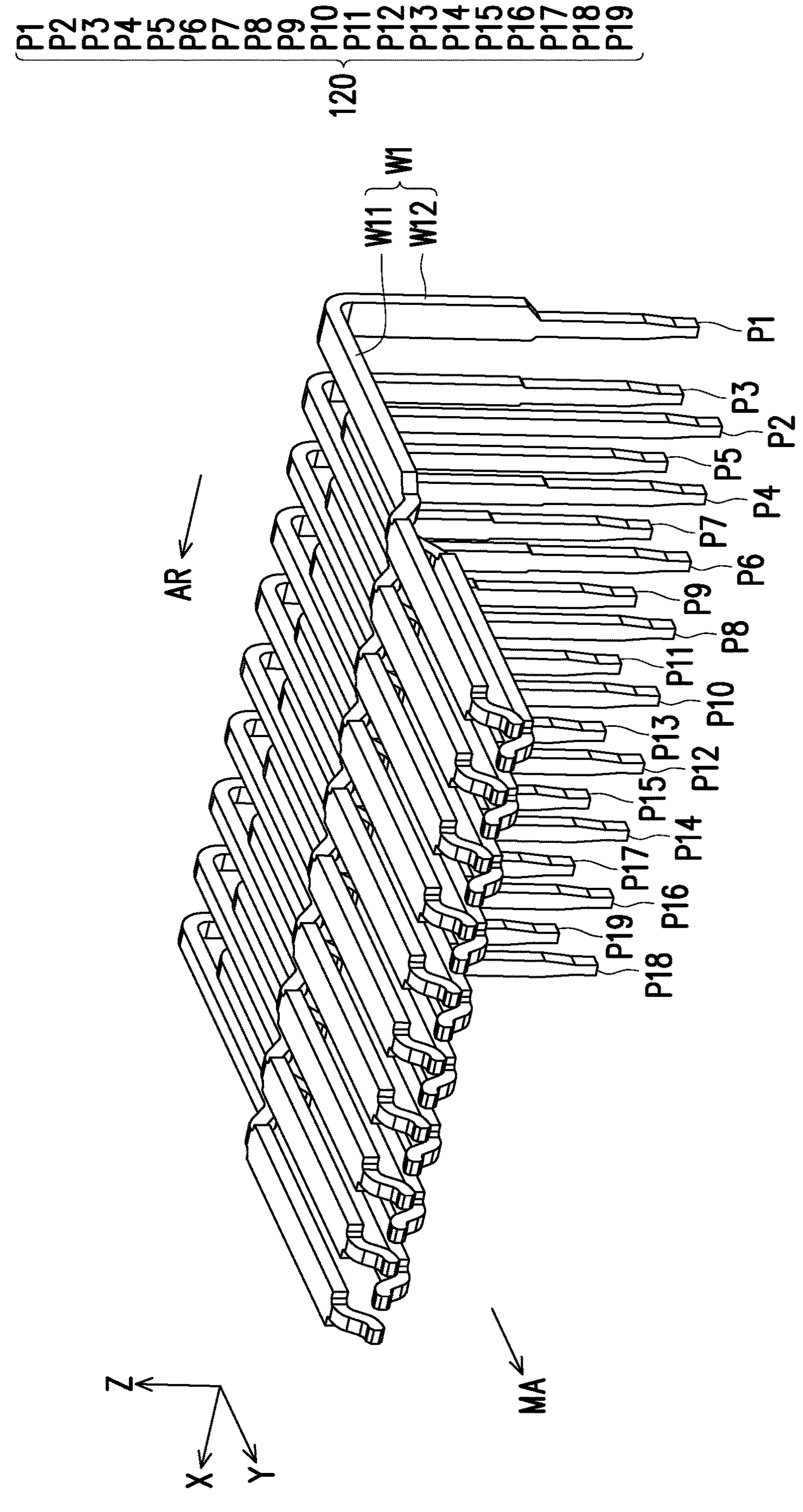
FIG. 3 is a schematic diagram of terminals of the electrical connector of FIG. 1.

FIG. 3 is a schematic diagram of terminals of the electrical connector of FIG. 1. Please refer to FIG. 2 and FIG. 3 at the same time. In the embodiment, the terminals 120 include ten terminals 120 located in an upper row and nine terminals 120 located in a lower row, and the ten terminals 120 and the nine terminals 120 are interleaved with each other along an arrangement direction AR of the terminals 120. At the same time, referring to FIG. 1, the metallic shell 130 has a short side edge 132 adjacent to the upper surface S1 and a long side edge 131 away from the upper surface S1. The ten terminals located in the upper row are adjacent to the long side edge 131 and away from the short side edge 132, and the nine terminals located in the lower row are adjacent to the short side edge 132 and away from the long side edge 131. Here, a pin assignment of the ten terminals 120 are sequentially a first terminal P1 (Data2+), a third terminal P3 (Data2−), a fifth terminal P5 (Data Shield), a seventh terminal P7 (Data0+), a ninth terminal P9 (Data0−), an eleventh terminal P11 (Data3 Shield), a thirteenth terminal P13 (CEC), a fifteenth terminal P15 (SCL), a seventeenth terminal P17 (DDC/CEC Ground), and a nineteenth terminal P19 (Hot Plug Detec1) along the arrangement direction AR, and a pin assignment of the nine terminals 120 are sequentially a second terminal P2 (Data2 Shield), a fourth terminal P4 (Data1+), a sixth terminal P6 (Data1−), an eighth terminal P8 (Data0 Shield), a tenth terminal P10 (Data3+), a twelfth terminal P12 (Data3−), a fourteenth terminal P14 (Utility), a sixteenth terminal P16 (SDA), and an eighteenth terminal P18 (+5V Power) along the arrangement direction AR. It should also be noted that the electrical connector 100 is adapted to be connected to another electrical connector (not shown) along an insertion direction MA. The arrangement direction AR (toward a positive X-axis direction) and the insertion direction MA (toward a positive Y-axis direction) are orthogonal to each other.

Figure 4:
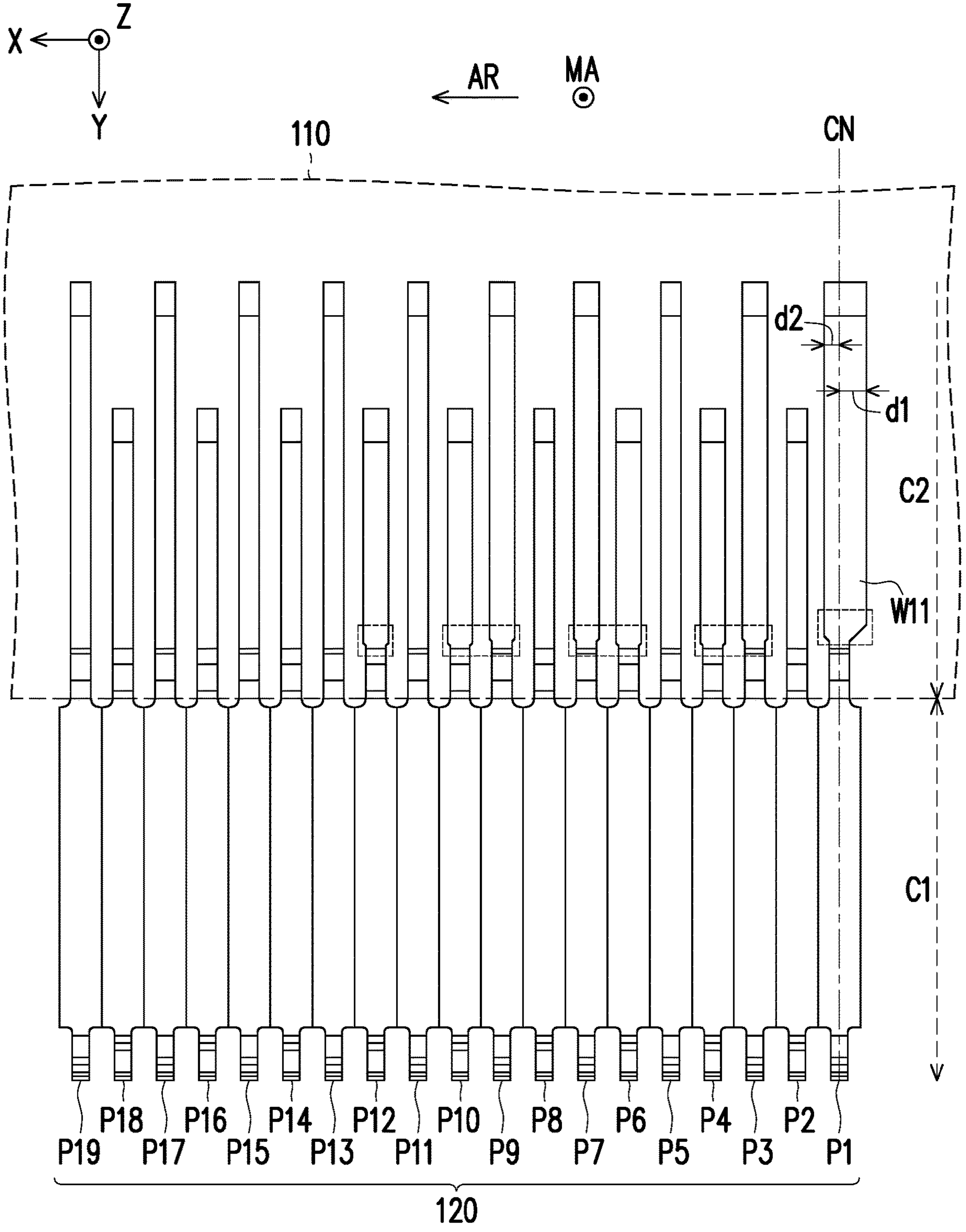
FIG. 4 and FIG. 5 illustrate the terminals of FIG. 3 from different perspectives.
Figure 5:
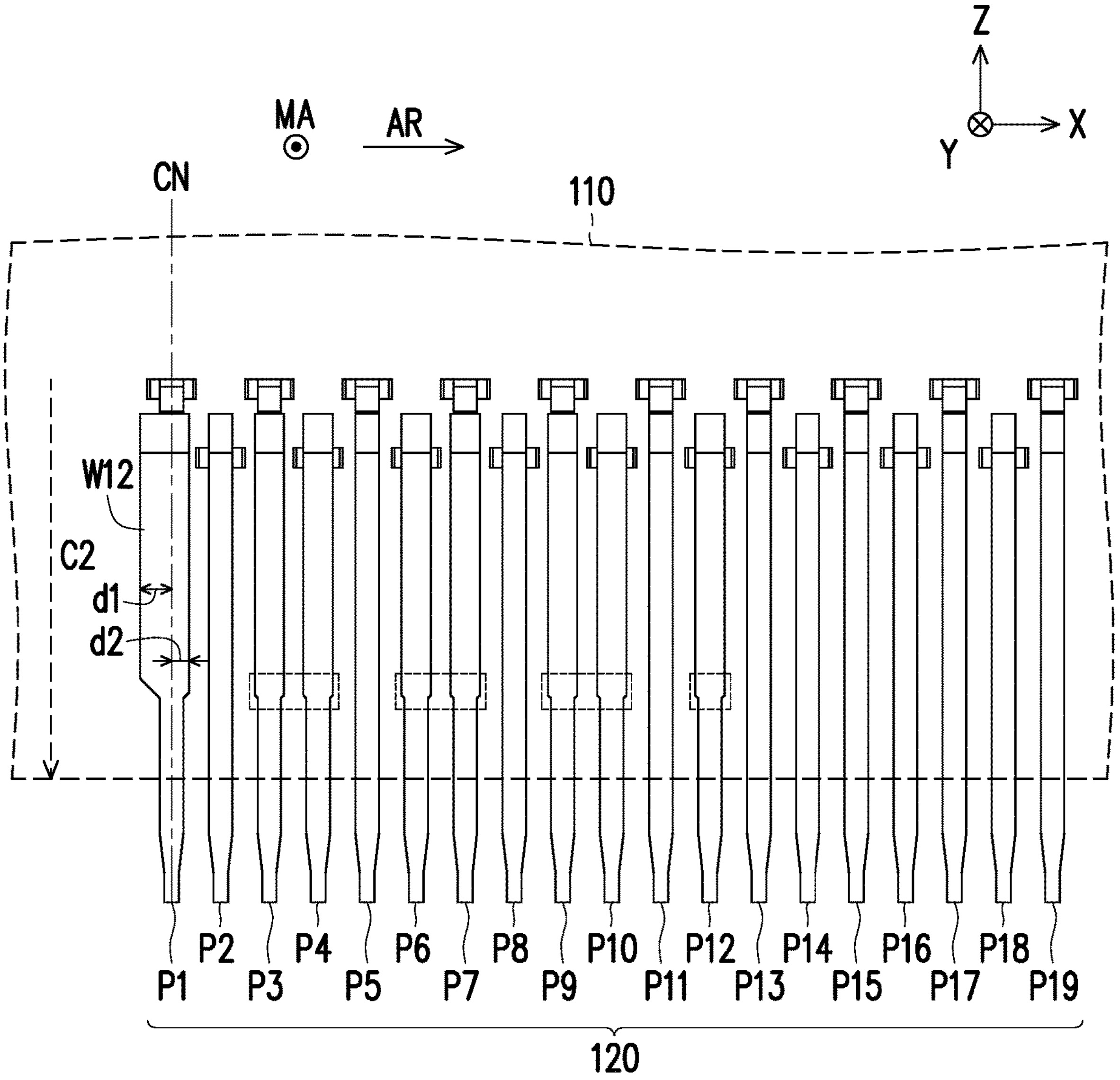

FIG. 4 and FIG. 5 illustrate the terminals of FIG. 3 from different perspectives. Please refer to FIG. 3 to FIG. 5 at the same time. As mentioned above, in order to meet the requirements for high-frequency signal transmission, the first terminal P1, the third terminal P3, the fourth terminal P4, the sixth terminal P6, the seventh terminal P7, the ninth terminal P9, the tenth terminal P10, and the twelfth terminal P12 of the embodiment are all used for data transmission, and have larger widths than the remaining terminals 120 to meet the requirements for transmission.

Furthermore, the first terminal P1 of the embodiment has a width of 0.50 mm to 0.53 mm, the third terminal P3 has a width of 0.30 mm to 0.33 mm, the fourth terminal P4 has a width of 0.30 mm to 0.33 mm, the sixth terminal P6 has a width of 0.30 mm to 0.33 mm, the seventh terminal P7 has a width of 0.30 mm to 0.33 mm, the ninth terminal P9 has a width of 0.30 mm to 0.33 mm, the tenth terminal P10 has a width of 0.30 mm to 0.33 mm, and the twelfth terminal P12 has a width of 0.30 mm to 0.33 mm. Correspondingly, the widths of the remaining terminals 120, that is, the width of the second terminal P2, the width of the fifth terminal P5, the width of the eighth terminal P8, the width of the eleventh terminal P11, the width of the thirteenth terminal P13, the width of the fourteenth terminal P14, the width of the fifteenth terminal P15, the width of the sixteenth terminal P16, the width of the seventeenth terminal P17, the width of the eighteenth terminal P18, and the width of the nineteenth terminal P19 are respectively 0.24 mm. Simply put, the widths of the terminals 120 used for data transmission in the embodiment are greater than the widths of the terminals 120 not used for data transmission. The width is the size of each terminal 120 along the arrangement direction AR.

Furthermore, as shown in FIG. 4 and FIG. 5, each of the first terminal P1, the third terminal P3, the fourth terminal P4, the sixth terminal P6, the seventh terminal P7, the ninth terminal P9, the tenth terminal P10, and the twelfth terminal P12 has a widening portion W1 and a contact section C1. The contact section C1 is exposed from the insulating body 110 to be in contact with a terminal of another electrical connector, and the widening portion W1 is located in the insulating body 110 (and similarly, the widening portion W1 of each of the third terminal P3, the fourth terminal P4, the sixth terminal P6, the seventh terminal P7, the ninth terminal P9, the tenth terminal P10, and the twelfth terminal P12 is also located in the insulating body 110). Furthermore, as shown in FIG. 3 and taking the first terminal P1 as an example, the first terminal P1 may be divided into the contact section C1 and a bending section C2, wherein the bending section C2 is equivalent to other portions of the first terminal P1 deducting the contact section C1 and includes a portion welded to the circuit board 200, wherein the widening portion W1 is located on the bending section C2.

As shown in FIG. 2, the insulating body 110 includes a base 111 and a tongue plate 112 extending from the base 111. The contact section C1 of the terminal 120 is located in the tongue plate 112 and partially exposes the tongue plate 112. The widening portion W1 is located in the base 111. The tongue plate 112 has an upper surface S3 and a lower surface S4 opposite to each other. The ten terminals 120 located in the upper row are located on the upper surface S3, and the nine terminals 120 located in the lower row are located on the lower surface S4. Here, the base 111 has a reference surface 111*a* facing the insertion direction MA, the tongue plate 112 extends from the reference surface 111*a* toward the insertion direction MA, and there is a step between the tongue plate 112 and the base 111.

Please refer to FIG. 4 and FIG. 5 again. In the embodiment, the widening portion W1 of the first terminal P1 is offset relative to the contact section C1 of the first terminal P1 along a direction opposite to the arrangement direction AR. The contact section C1 of the first terminal P1 has a symmetrical centerline CN extending to the widening portion W1. Opposite side edges of the widening portion W1 have widths d1 and d2 that are not equal to each other relative to the symmetrical centerline CN. There is the width d1 of 0.32 mm from the symmetrical centerline CN to a side edge of the widening portion W1 along an opposite direction (that is, toward a negative X-axis direction) of the arrangement direction AR, and there is the width d2 of 0.18 mm from the symmetrical centerline CN to another side edge of the widening portion W1 along the arrangement direction AR. As shown in FIG. 3 to FIG. 5, the widening portion W1 includes different portions W11 and W12, wherein the portion W11 is located on a structure extending along the insertion direction MA (along an Y axis) in the bending section C2, the portion W12 is located on a structure extending along a Z axis in the bending section C2, and whether the portion W11 or the portion W12 both complies with the corresponding relationship of the widths d1 and d2.

Except for the first terminal P1, the remaining terminals 120 used for data transmission (that is, the third terminal P3, the fourth terminal P4, the sixth terminal P6, the seventh terminal P7, the ninth terminal P9, the tenth terminal P10, and the twelfth terminal P12) are not offset and are symmetrically disposed, that is, the symmetrical centerline of each terminal (the third terminal P3, the fourth terminal P4, the sixth terminal P6, the seventh terminal P7, the ninth terminal P9, the tenth terminal P10, and the twelfth terminal P12) to opposite side edges have the same width, and in the embodiment, the width from the symmetrical centerline to the opposite side edge is 0.15 mm.

Figure 6:
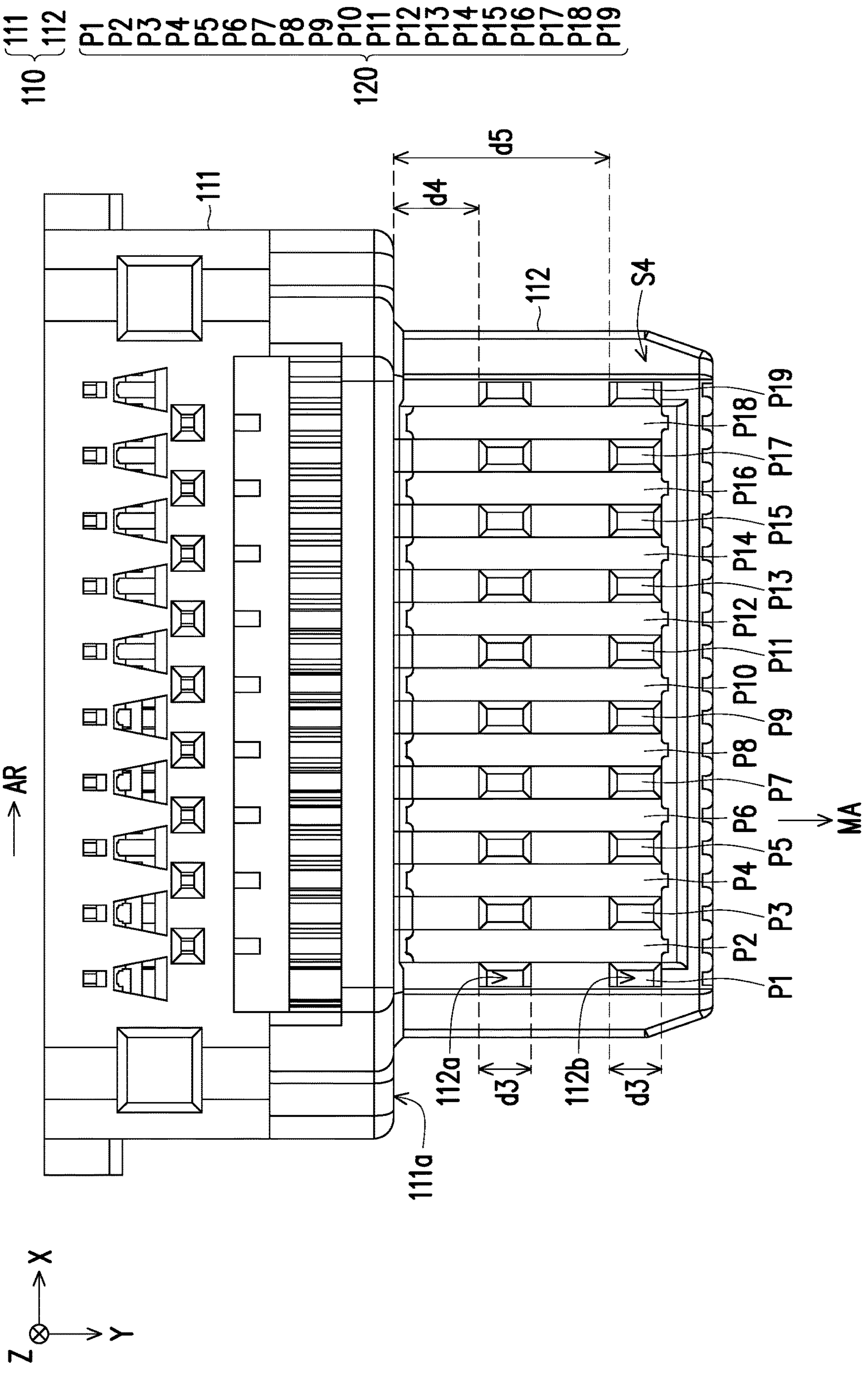
FIG. 6 and FIG. 7 illustrate the partial components of the electrical connector of FIG. 2 from different perspectives.
Figure 7:
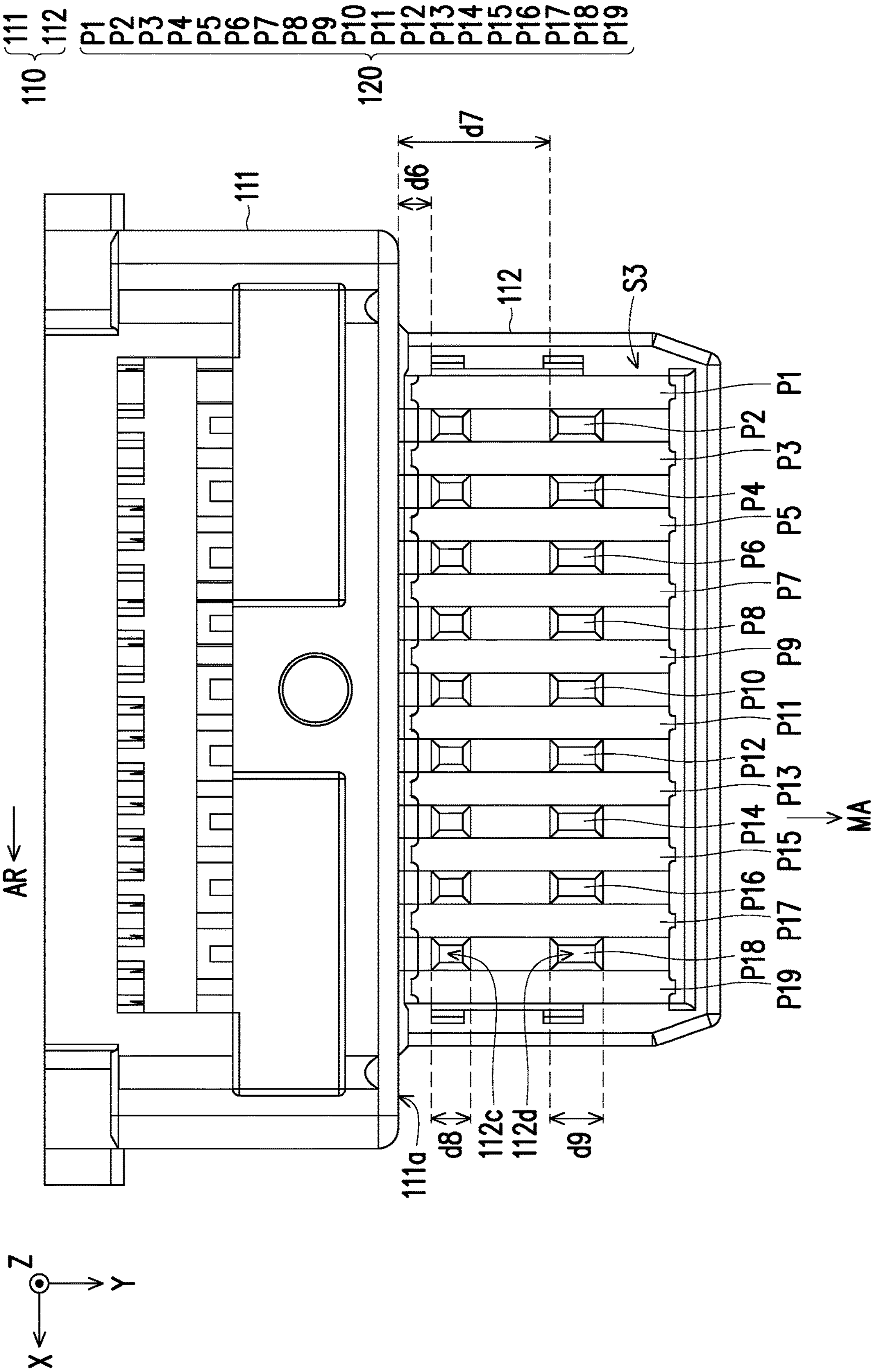

FIG. 6 and FIG. 7 illustrate the partial components of the electrical connector of FIG. 2 from different perspectives. Please refer to FIG. 6 and FIG. 7 at the same time and with reference to FIG. 2. In the embodiment, the tongue plate 112 has multiple openings 112*c* and 112*d* (only two of which are marked as an example) located on the upper surface S3, and multiple openings 112*a* and 112*b* (only two of which are marked as an example) located on the lower surface S4. The openings 112*a* and 112*b* located on the lower surface S4 partially expose the ten terminals 120 located in the upper row, and the openings 112*c* and 112*d* located on the upper surface S3 partially expose the nine terminals 120 located in the lower row.

Furthermore, in order to meet the requirements for transmission of a high-frequency signal, another means is to reduce the impedance of the terminals 120 when transmitting the signal. Accordingly, the embodiment offers further limitation corresponding to the openings 112*a*, 112*b*, 112*c*, and 112*d* to reduce the impedance. Here, as shown in FIG. 6, the openings 112*a* and 112*b* located on the lower surface S4 are arranged into a first row and a second row (similarly, only one opening each is marked as an example) along the arrangement direction AR, the opening 112*a* is located in the first row, and the opening 112*b* is located in the second row, wherein there is a distance d4 of 1.3 mm between the first row and the reference plane 111*a*, and there is a distance d5 of 3.3 mm between the second row and the reference plane 111*a*. At the same time, each opening 112*a* located in the first row has an opening size d3 of 0.8 mm along the insertion direction MA, and each opening 112*b* located in the second row has the same opening size d3 of 0.8 mm along the insertion direction MA.

In addition, as shown in FIG. 7, the openings 112*c* and 112*d* located on the upper surface S3 are arranged into a first row and a second row along the arrangement direction AR. There is a distance d6 of 0.5 mm between the first row and the reference surface 111*a*, and there is a distance d7 of 2.3 mm between the second row and the reference plane 111*a*. Each opening 112*c* located in the first row has an opening size d8 of 0.6 mm along the insertion direction MA, and each opening 112*d* located in the second row has an opening size d9 of 2.3 mm along the insertion direction MA.

Based on the above, compared with an existing electrical connector with HDMI 2.0 specification whose openings for exposing terminals on a tongue plate are all 0.5 mm, by enlarging all the openings 112*a*, 112*b*, 112*c*, and 112*d*, the embodiment can effectively reduce the impedance of the terminals to meet the requirements of HDMI 2.1 for high-speed transmission.

In summary, in the above embodiments of the disclosure, the electrical connector with HDMI 2.1 specification includes the insulating body, the terminals, and the metallic shell. The metallic shell partially covers the insulating body and the terminals. The terminals include the ten terminals located in the upper row and the nine terminals located in the lower row, and have specific pin assignments along the arrangement direction. Furthermore, there are differences in the widths of the terminals along the arrangement direction, wherein the first terminal, the third terminal, the fourth terminal, the sixth terminal, the seventh terminal, the ninth terminal, the tenth terminal, and the twelfth terminal have larger widths, that is, the terminals with larger widths are used to transmit data, so the requirements for high-frequency signal transmission can be met through increasing the widths of the terminals.

What is claimed is:

1. An electrical connector with HDMI 2.1 specification, comprising:

an insulating body;

a plurality of terminals, disposed in the insulating body, wherein the terminals comprise ten terminals located in an upper row and nine terminals located in a lower row, the ten terminals and the nine terminals are interleaved with each other along an arrangement direction, a pin assignment of the ten terminals are sequentially a first terminal Data2+, a third terminal Data2−, a fifth terminal Data Shield, a seventh terminal Data0+, a ninth terminal Data0−, an eleventh terminal Data3 Shield, a thirteenth terminal CEC, a fifteenth terminal SCL, a seventeenth terminal DDC/CEC Ground, and a nineteenth terminal Hot Plug Detec1 along the arrangement direction, and a pin assignment of the nine terminals are sequentially a second terminal Data2 Shield, a fourth terminal Data1+, a sixth terminal Data1−, an eighth terminal Data0 Shield, a tenth terminal Data3+, a twelfth terminal Data3−, a fourteenth terminal Utility, a sixteenth terminal SDA, and an eighteenth terminal +5V Power along the arrangement direction; and a metallic shell, partially enclosing the insulating body and the terminals to form an insertion space.

2. The electrical connector according to claim 1, wherein the first terminal, the third terminal, the fourth terminal, the sixth terminal, the seventh terminal, the ninth terminal, the tenth terminal, and the twelfth terminal have widths that are greater than widths of the second terminal, the fifth terminal, the eighth terminal, the eleventh terminal, the thirteenth terminal, the fourteenth terminal, the fifteenth terminal, the sixteenth terminal, the seventeenth terminal, the eighteenth terminal, and the nineteenth terminal.

3. The electrical connector according to claim 2, wherein the width is a size of each of the terminals along the arrangement direction.

4. The electrical connector according to claim 1, wherein the first terminal has a width of 0.50 mm to 0.53 mm, the third terminal has a width of 0.30 mm to 0.33 mm, the fourth terminal has a width of 0.30 mm to 0.33 mm, the sixth terminal has a width of 0.30 mm to 0.33 mm, the seventh terminal has a width of 0.30 mm to 0.33 mm, the ninth terminal has a width of 0.30 mm to 0.33 mm, the tenth terminal has a width of 0.30 mm to 0.33 mm, and the twelfth terminal has a width of 0.30 mm to 0.33 mm.

5. The electrical connector according to claim 1, wherein a width of the second terminal, a width of the fifth terminal, a width of the eighth terminal, a width of the eleventh terminal, a width of the thirteenth terminal, a width of the fourteenth terminal, a width of the fifteenth terminal, a width of the sixteenth terminal, a width of the seventeenth terminal, a width of the eighteenth terminal, and a width of the nineteenth terminal are respectively 0.24 mm.

6. The electrical connector according to claim 1, wherein each of the first terminal, the third terminal, the fourth terminal, the sixth terminal, the seventh terminal, the ninth terminal, the tenth terminal, and the twelfth terminal has a widening portion and a contact section, the contact section is exposed from the insulating body to be in contact with a terminal of another electrical connector, and the widening portion is located in the insulating body.

7. The electrical connector according to claim 6, wherein the insulating body comprises a base and a tongue plate extending from the base, the contact section is located in the tongue plate and partially exposes the tongue plate, and the widening portion is located in the base.

8. The electrical connector according to claim 7, wherein the tongue plate has an upper surface and a lower surface opposite to each other, the ten terminals located in the upper row are located on the upper surface, and the nine terminals located in the lower row are located on the lower surface.

9. The electrical connector according to claim 8, wherein the tongue plate has a plurality of openings located on the upper surface and a plurality of openings located on the lower surface, the openings located on the lower surface partially expose the ten terminals located in the upper row, and the openings located on the upper surface partially expose the nine terminals located in the lower row.

10. The electrical connector according to claim 9, adapted to be connected to another electrical connector along an insertion direction, wherein the insertion direction is orthogonal to the arrangement direction, the tongue plate extends from a reference surface of the base toward the insertion direction, the openings located on the upper surface are arranged into a first row and a second row along the arrangement direction, there is a distance of 0.5 mm between the first row and the reference plane, there is a distance of 2.3 mm between the second row and the reference plane, each of the openings located in the first row has an opening size of 0.6 mm along the insertion direction, and each of the openings located in the second row has an opening size of 0.8 mm along the insertion direction.

11. The electrical connector according to claim 9, adapted to be connected to another electrical connector along an insertion direction, wherein the insertion direction is orthogonal to the arrangement direction, the tongue plate extends from a reference surface of the base toward the insertion direction, the openings located on the lower surface are arranged into a first row and a second row along the arrangement direction, there is a distance of 1.3 mm between the first row and the reference plane, there is a distance of 3.3 mm between the second row and the reference plane, each of the openings located in the first row has an opening size of 0.8 mm along the insertion direction, and each of the openings located in the second row has an opening size of 0.8 mm along the insertion direction.

12. The electrical connector according to claim 6, wherein the widening portion of the first terminal is offset relative to the contact section of the first terminal along a direction opposite to the arrangement direction.

13. The electrical connector according to claim 6, wherein the contact section of the first terminal has a symmetrical centerline extending to the widening portion, and opposite side edges of the widening portion have widths that are not equal to each other relative to the symmetrical centerline.

14. The electrical connector according to claim 13, wherein there is a width of 0.32 mm from the symmetrical centerline to a side edge of the widening portion along an opposite direction of the arrangement direction, and there is a width of 0.18 mm from the symmetrical centerline to another side edge of the widening portion along the arrangement direction.

15. An electrical connector with HDMI 2.1 specification, comprising:

an insulating body;

a plurality of terminals, disposed in the insulating body, wherein the terminals comprise ten terminals located in an upper row and nine terminals located in a lower row, the ten terminals and the nine terminals are interleaved with each other along an arrangement direction, a pin assignment of the ten terminals are sequentially a first terminal Data2+, a third terminal Data2−, a fifth terminal Data Shield, a seventh terminal Data0+, a ninth terminal Data0−, an eleventh terminal Data3 Shield, a thirteenth terminal CEC, a fifteenth terminal SCL, a seventeenth terminal DDC/CEC Ground, and a nineteenth terminal Hot Plug Detec1 along the arrangement direction, and a pin assignment of the nine terminals are sequentially a second terminal Data2 Shield, a fourth terminal Data1+, a sixth terminal Data1−, an eighth terminal Data0 Shield, a tenth terminal Data3+, a twelfth terminal Data3−, a fourteenth terminal Utility, a sixteenth terminal SDA, and an eighteenth terminal +5V Power along the arrangement direction, the first terminal has a width of 0.50 mm to 0.53 mm, the third terminal has a width of 0.30 mm to 0.33 mm, the fourth terminal has a width of 0.30 mm to 0.33 mm, the sixth terminal has a width of 0.30 mm to 0.33 mm, the seventh terminal has a width of 0.30 mm to 0.33 mm, the ninth terminal has a width of 0.30 mm to 0.33 mm, the tenth terminal has a width of 0.30 mm to 0.33 mm, and the twelfth terminal has a width of 0.30 mm to 0.33 mm; and a metallic shell, partially enclosing the insulating body and the terminals to form an insertion space.

16. The electrical connector according to claim 15, wherein a width of the second terminal, a width of the fifth terminal, a width of the eighth terminal, a width of the eleventh terminal, a width of the thirteenth terminal, a width of the fourteenth terminal, a width of the fifteenth terminal, a width of the sixteenth terminal, a width of the seventeenth terminal, a width of the eighteenth terminal, and a width of the nineteenth terminal are respectively 0.24 mm.

17. The electrical connector according to claim 15, wherein the width is a size of each of the terminals along the arrangement direction.

18. The electrical connector according to claim 15, wherein each of the first terminal, the third terminal, the fourth terminal, the sixth terminal, the seventh terminal, the ninth terminal, the tenth terminal, and the twelfth terminal has a widening portion and a contact section, the contact section is exposed from the insulating body to be in contact with a terminal of another electrical connector, the widening portion is located in the insulating body, and the width is a size of the widening portion along the arrangement direction.

19. The electrical connector according to claim 18, wherein the insulating body comprises a base and a tongue plate extending from the base, the contact section is located in the tongue plate and partially exposes the tongue plate, and the widening portion is located in the base.

20. The electrical connector according to claim 19, wherein the tongue plate has an upper surface and a lower surface opposite to each other, the ten terminals located in the upper row are located on the upper surface, and the nine terminals located in the lower row are located on the lower surface.

21. The electrical connector according to claim 20, wherein the tongue plate has a plurality of openings located on the upper surface and a plurality of openings located on the lower surface, the openings located on the lower surface partially expose the ten terminals located in the upper row, and the openings located on the upper surface partially expose the nine terminals located in the lower row.

22. The electrical connector according to claim 21, adapted to be connected to another electrical connector along an insertion direction, wherein the insertion direction is orthogonal to the arrangement direction, the tongue plate extends from a reference surface of the base toward the insertion direction, the openings located on the upper surface are arranged into a first row and a second row along the arrangement direction, there is a distance of 0.5 mm between the first row and the reference plane, there is a distance of 2.3 mm between the second row and the reference plane, each of the openings located in the first row has an opening size of 0.6 mm along the insertion direction, and each of the openings located in the second row has an opening size of 2.3 mm along the insertion direction.

23. The electrical connector according to claim 21, adapted to be connected to another electrical connector along an insertion direction, wherein the insertion direction is orthogonal to the arrangement direction, the tongue plate extends from a reference surface of the base toward the insertion direction, the openings located on the lower surface are arranged into a first row and a second row along the arrangement direction, there is a distance of 1.3 mm between the first row and the reference plane, there is a distance of 3.3 mm between the second row and the reference plane, each of the openings located in the first row has an opening size of 0.8 mm along the insertion direction, and each of the openings located in the second row has an opening size of 0.8 mm along the insertion direction.

24. The electrical connector according to claim 18, wherein the widening portion of the first terminal is offset relative to the contact section of the first terminal along a direction opposite to the arrangement direction.

25. The electrical connector according to claim 18, wherein the contact section of the first terminal has a symmetrical centerline extending to the widening portion, and opposite side edges of the widening portion have widths that are not equal to each other relative to the symmetrical centerline.

26. The electrical connector according to claim 25, wherein there is a width of 0.32 mm from the symmetrical centerline to a side edge of the widening portion along an opposite direction of the arrangement direction, and there is a width of 0.18 mm from the symmetrical centerline to another side edge of the widening portion along the arrangement direction.

* * * * *